Nov. 7, 1961 C. C. McMAHON 3,008,110
VARIABLE RHEOSTAT

Filed Feb. 2, 1959 3 Sheets-Sheet 1

INVENTOR.
Clifford C. McMahon.
BY
Harness, Dickey & Pierce.
ATTORNEYS.

Nov. 7, 1961
C. C. McMAHON
3,008,110
VARIABLE RHEOSTAT
Filed Feb. 2, 1959
3 Sheets-Sheet 2
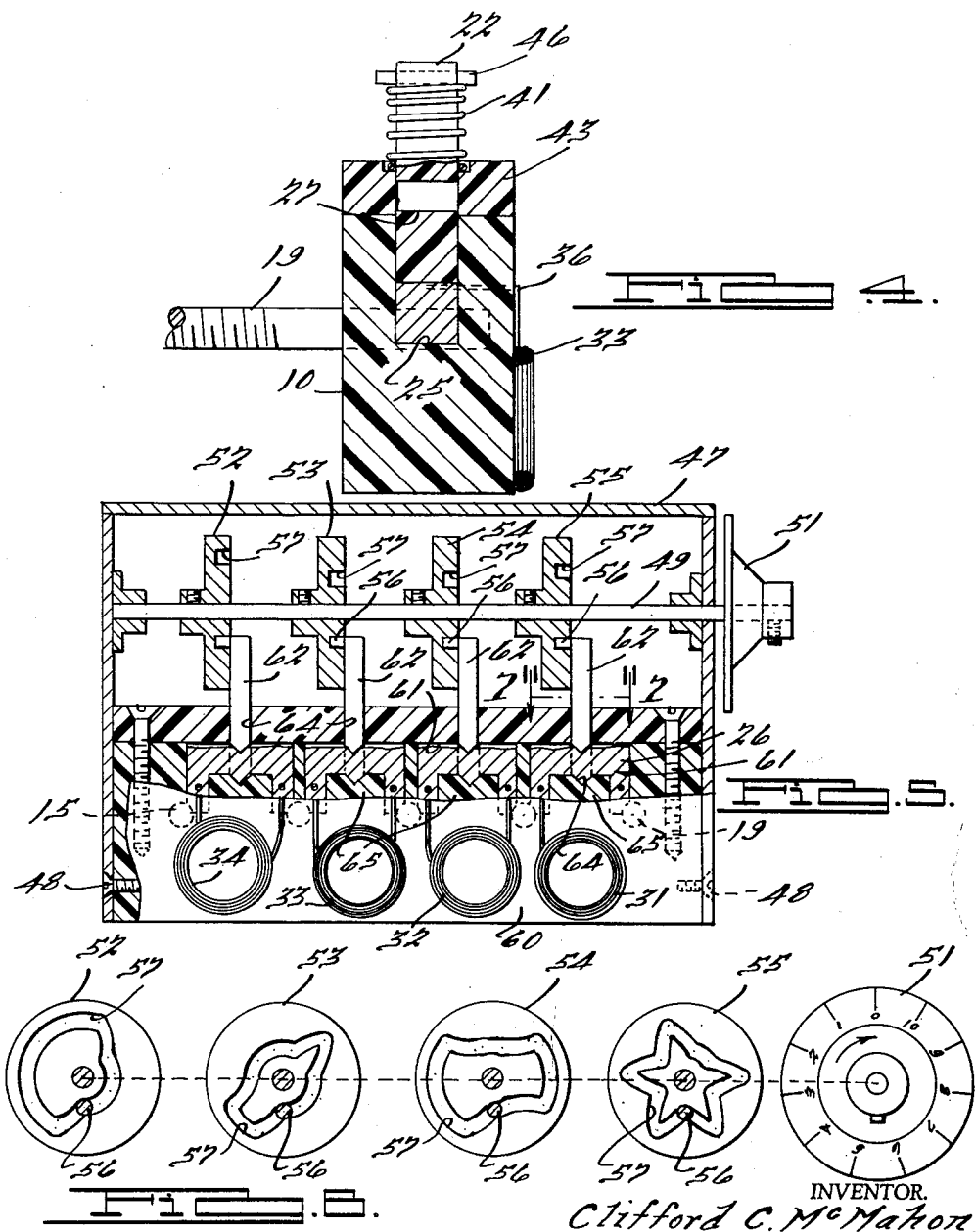
INVENTOR.
Clifford C. McMahon
BY
Harness, Dickey & Pierce
ATTORNEYS.

Nov. 7, 1961   C. C. McMAHON   3,008,110
VARIABLE RHEOSTAT
Filed Feb. 2, 1959   3 Sheets-Sheet 3
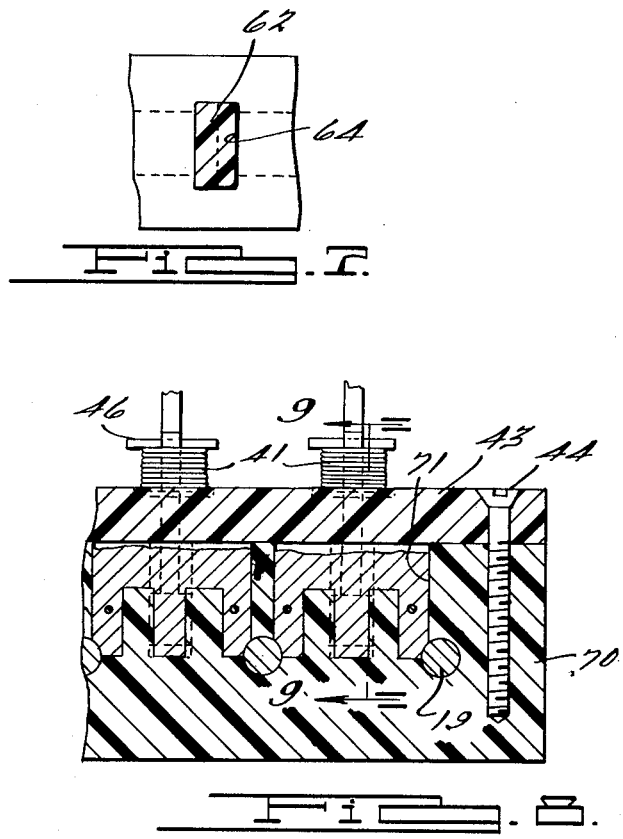
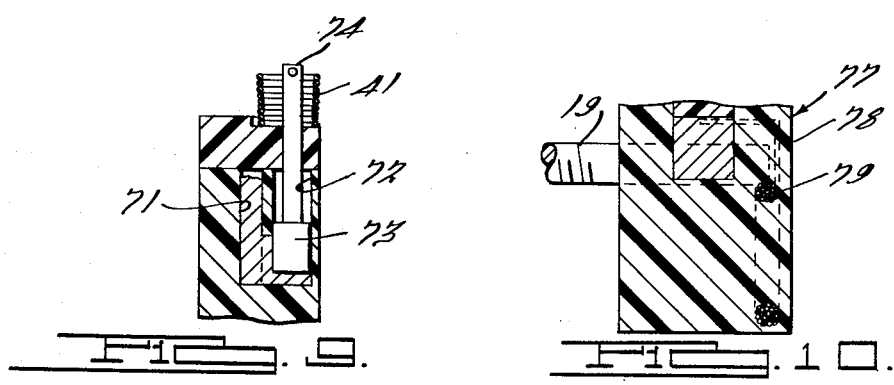
INVENTOR.
Clifford C. McMahon
BY
Harness, Dickey & Pierce
ATTORNEYS.

United States Patent Office 3,008,110
Patented Nov. 7, 1961

3,008,110
VARIABLE RHEOSTAT
Clifford C. McMahon, Detroit, Mich., assignor to Hoskins Manufacturing Company, Detroit, Mich., a corporation of Michigan
Filed Feb. 2, 1959, Ser. No. 790,621
12 Claims. (Cl. 338—84)

This invention relates to rheostats, and particularly to a rheostat which may be readily and quickly adjusted to change the resistance of a circiut.

The present invention pertains to a device having resistor coils disposed in series relation to each other and having means for shunting out any or all of the resistor coils. This is accomplished in various manners as hereinafter illustrated and described, a simple form of device embodying a plurality of coils in a ratio of 1, 2, 2 and 5, whereby a combination would produce any resistance in unit increments from 1 to 10. Thus, if the resistance elements were 1000, 2000, 2000 and 5000 ohms, any resistance from 1000 to 10,000 ohms could be provided in increments of 1000.

The ends of the coils are disposed in pools of mercury, so connected as to be in series with each other and with a pair of terminals. Movable elements produce the displacement of the mercury to bridge the area between the terminals of each coil and thereby shunt it out of the series or add it to thereto when the bridge is broken. A mechanism is preferably provided which, through its actuation, will encircuit the resistor coils in relation to each other to produce increments of resistance in the ratio of from 1 to 10, as pointed out hereinabove.

Accordingly, the main objects of the invention are: to provide a rheostat containing a number of resistor coils which may be disposed in series and which may be individually shunted out of the series relationship; to provide a plurality of resistor coils having the terminal ends interconnected to be disposed in series relation combined with means for shunting out any number of the coils from the series to vary the resistance provided thereby; to dispose the ends of resistor coils in pools of mercury to be in series relation to each other, with means employed for selectively bridging the pools to shunt out one or more of the resistor coils, and, in general, to provide a rheostat which is simple in construction, positive in operation and economical to manufacture.

Other objects and features of novelty of the invention will be specifically pointed out or will become apparent when referring, for a better understanding of the invention, to the following description taken in conjunction with the accompanying drawings, wherein:

FIG. 4 is a sectional view of the structure illustrated in FIG. 1, taken on the line 4—4 thereof;

FIG. 5 is a reduced, broken sectional view of the structure, similar to that illustrated in FIG. 1, showing another form of the invention;

FIG. 6 is an exploded view of the operating mechanism of the device illustrated in FIG. 5;

FIG. 7 is an enlarged, broken sectional view of the structure illustrated in FIG. 5, taken on the line 7—7 thereof;

FIG. 8 is a reduced broken view of structure, similar to that illustrated in FIG. 2 showing another form which the invention may assume;

FIG. 9 is a sectional view of the structure illustrated in FIG. 8, taken on the line 9—9 thereof, and FIG. 10 is a broken view of structure, similar to that illustrated in FIG. 4, showing still another form of the invention.

Figure 1:
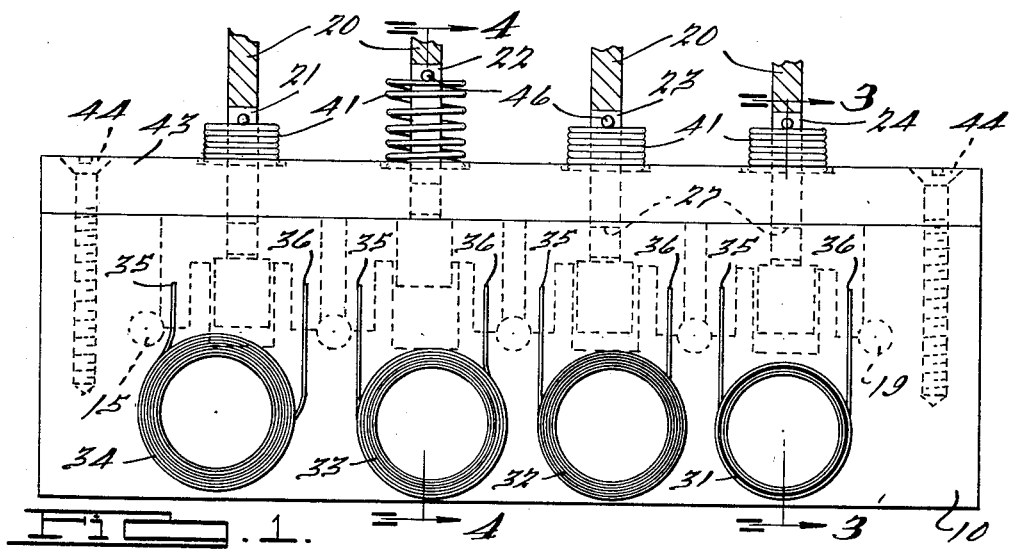
FIGURE 1 is a broken plan view of a rheostat embodying features of the present invention.
Figure 2:
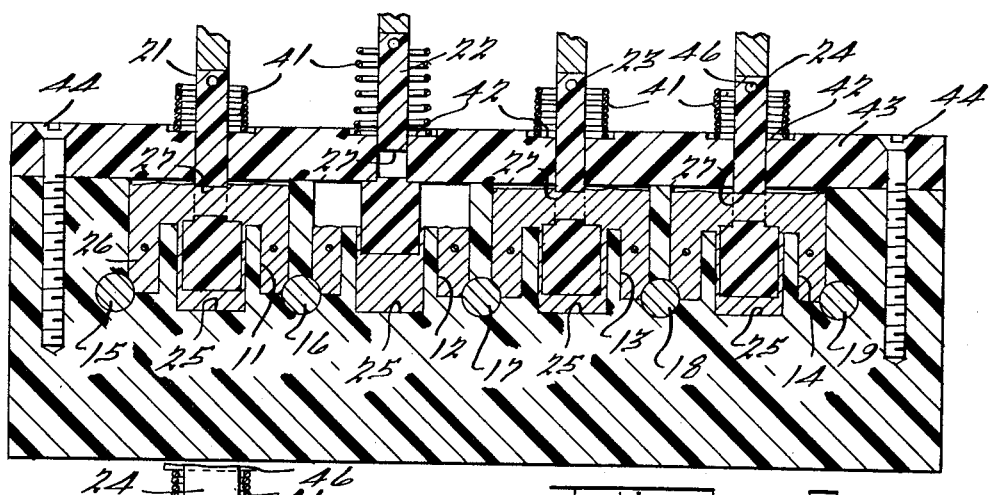
FIG. 2 is a sectional view of the structure illustrated in FIG. 1.
Figure 3:
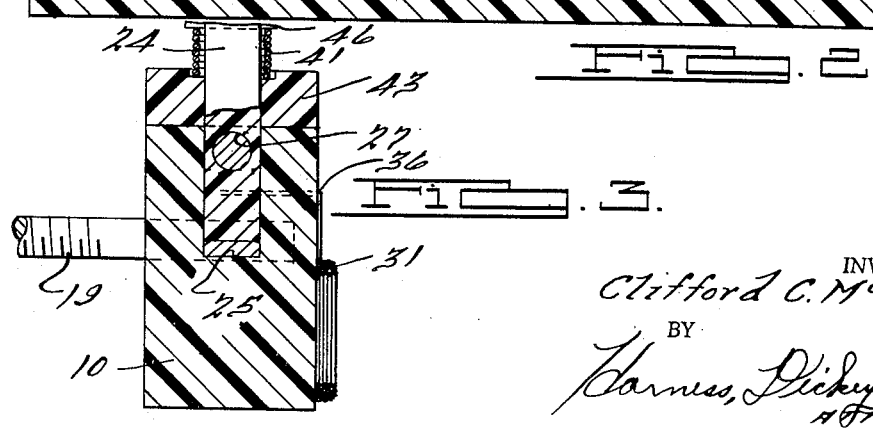
FIG. 3 is a sectional view of the structure illustrated in FIG. 1, taken on the line 3—3 thereof.

Referring to FIGS. 1 to 4, a rheostat is illustrated comprising a body 10 of insulating material having inverted E-shaped recesses 11, 12, 13 and 14 extending downwardly therein. Studs 15, 16, 17, 18 and 19 interconnect the ends of adjacent arms of the recesses, with the studs 15 and 19 extending beyond the body 10, as illustrated in FIGS. 3 and 4, and provided with a thread by which they are connected in a circuit. Plungers 21, 22, 23 and 24 extend within the central branch 25 of the associated recesses 11, 12, 13 and 14 for the purpose of displacing a sufficient amount of mercury 26 when moved downwardly thereinto. In the recesses 11, 13 and 14, the plungers 21, 23 and 24 have been moved to lowermost position in the brackets 25 of the recesses 11, 13 and 14. This forces the mercury to pass outwardly thereof and bridge over the two end arms of the recess through an aperture 27 in the plungers. The plunger 22 is in its uppermost position relative to the central branch 25 of the recess 12, permitting the mercury to flow into the central branch 25 and thereby break the conductive bridge between the two end arms of the inverted E-shaped recess 12. Thus, when the plungers are down, as in the recesses 11, 13 and 14, the two end arms of the recess are bridged and the resistor coils are shunted from the circuit. When the plungers are up, as in the recess 12, the two end arms are disconnected since the mercury has flowed back into the central branch 25 and the conducting bridge thereacross is broken.

Resistor coils 31, 32, 33 and 34 have their ends 35 and 36 extend through apertures in the body 10 into the two end arms of the inverted E-shaped recesses 11, 12, 13 and 14, as clearly illustrated in the figures. It will be seen that when the plungers are in retracted or uppermost position, as plungers 22 associated with the recess 12, all of the resistor coils 31, 32, 33 and 34 will be in series with the terminals 15 and 19 and full resistance will thereby be provided by the device. When any one or all of the plungers 21, 22, 23 and 24 are moved downwardly into the central branch 25 of the inverted E-shaped recesses 11, 12, 13 and 14, the coil associated with the respective recess is shunted out by the mercury bridging across the two end arms of the recess, to thereby shunt out the associated coil. In this manner, all of the coils may be shunted out so that no resistance will be present or any one or a combination of the coils can be left in series to produce a variation in the resistance provided by the unit. Thus, if the coil 31 is 1000 ohms, the coils 32 and 33 are 2000 ohms and the coil 34 is 5000, then by the proper selection of the combination of coils, a resistance from 1000 ohms to 10,000 ohms in increments of 1000 ohms will be provided by the device.

The plungers may be adjusted to upward and downward position manually by push buttons or cam means 20. It will be noted in the figures that coil springs 41 are provided about each of the plungers, the lower end being disposed in recesses 42 in a top plate 43 which encloses the recesses and guides the plungers when secured thereon by a plurality of screws 44. A pin 46 extends through the plungers in engagement with the top of the springs, causing the plungers to be urged upwardly thereby. The spring retains the plungers in retracted, uppermost position, with all of the resistor coils 31, 32, 33 and 34 in series relation to each other and the terminals 15 and 19.

In FIGS. 5 and 6, a mechanism is illustrated for moving the plungers upwardly and downwardly, the mechanism consisting of a housing 47 which extends over the body 60 and is secured thereto by a plurality of screws 48.

The housing journals a shaft 49 having a dial knob 51 at one end containing readings from 0 to 10 in increments of one unit. Each of the plungers has a cam plate 52, 53, 54 and 55 associated therewith and secured to the shaft 49 to rotate therewith. Each of the plungers has a finger 56 which extends into a cam slot 57 in its respective cam plate. By rotating the cam plates, the plungers are raised and lowered in conformity with the readings on the dial. In FIG. 6, an exploded view of the cam plates and the dial knob in their associated arrangements is illustrated. It will be noted that when the dial knob indicates the zero position, all of the plungers 62 are in raised position. This is true for the device illustrated in FIG. 5, while for the device illustrated in FIG. 2 the plungers 21 to 24 would be in lowered position and in both arrangements the resistor coils will be shunted out of the circuit and no resistor will be in the circuit between the terminals 15 and 19. When the dial knob 51 is advanced to position 1, the cam plate 55 lowers the plunger 62 to place the 1000 ohm coil 31 in series with the contacts 15 and 19. Advancing the knob to position 2, the cam plates 55 would actuate its plunger 62 upwardly, while the cam plate 54 will actuate its plunger 62 downwardly, thereby having the 2000 ohm coil 32 in series with the terminals 15 and 19. When the dial is advanced to position 3, the coils 31 and 32 are in series with the terminals 15 and 19, thus inserting 3000 ohms resistance in the circuit. When the dial is advanced to position 4, the cam plates 53 and 54 connect the coils 32 and 33 in the circuit while the coil 31 is shunted therefrom, thus providing 4000 ohms of resistance in the circuit. When the dial is advanced to position 5, the cam plates 53, 54 and 55 retract the plungers and the cam plate 52 places the coil 34 in the circuit, providing 5000 ohms of resistance. When the dial is advanced to position 6, the cam plate 52 retains the coil 34 in the circuit for this and for positions 6, 7, 8, 9 and 10, while cam plates 53, 54 and 55 repeat the positions indicated above for positions 1, 2, 3 and 4 to which the 5000 ohms resistance is added, thereby providing 6000, 7000, 8000 and 9000, with all of the coils producing the 10,000 ohms of resistance in the circuit.

In the structure of FIG. 5, the body 60 has inverted U-shaped recesses 61 provided with a central boss 65. The plungers 62 are sealed to the sides of the recess and the sharp ends 63 enter V-shaped notches 64 to separate the mercury 26 and thereby remove the shunt across the coil which is placed in series with the terminals 15 and 19. Otherwise, the device is the same as that of FIG. 2 with the exception that it is the downward movement of the plunger 62 which causes the coils to be placed in circuit, while it is the upward movement of the plungers 21, 22, 23 and 24 of the device of FIG. 2 which causes the coils to be placed in series with each other and the terminals.

It will be noted in FIG. 10 that the device 77 has the coils 79 molded directly into the body 78 rather than secured to the side of the body by an adhesive or other material, as illustrated in the prior figures. The terminal portions 15, 16, 17, 18 and 19 are molded directly into the body during the molding operation.

A still further form of the invention is illustrated in FIG. 8, wherein a body 70 has a plurality of inverted E-shaped recesses 71, each connected with a recess 72. A displacement piston 73 is disposed in each recess 72 connected to a plunger 74 which, when moved downwardly, forces mercury from the recess 72 into the recess 71, to thereby overflow the two end branches thereof and to shunt thereacross to cut the associated coil out of a circuit containing the device. By advancing and retracting the plungers 74 manually or by the use of the shaft 49 and dial knob 51 and the associated cam plates, the mercury is raised and lowered in the inverted E-shaped recess 71, to thereby bridge across the end portions or to isolate the end portions from each other. In the former instance, a resistor coil is shunted out of the circuit and in the latter instance it is disposed in series therewith between the terminals 15 and 19. Other arrangements known to those skilled in the art may be employed for displacing the mercury and shunting out the coils so that, through the manipulation of the plungers individually or in series, different degrees of resistances are accurately provided by the device. The particular embodiments herein illustrated have been shown and described by way of example and therefore are not to be considered limiting for teaching the method of providing a series of resistance in uniform steps.

What is claimed is:

1. A rheostat comprising a body of insulating material, a plurality of resistance coils supported by said body disposed in series relation to each other, means for shunting one or a plurality of the coils from the series, said shunting means providing a flow of mercury to and from bridging relation with the ends of the coils, and a series of cam plates one for each of said coils for moving said shunting means.

2. A rheostat comprising a body of insulating material, a plurality of resistance coils supported by said body disposed in series relation to each other, means for shunting one or a plurality of the coils from the series, said shunting means providing a flow of mercury to and from bridging relation with the ends of the coils, a series of cam plates one for each of said coils for moving said shunting means, a shaft for supporting said cam plates, and a dial knob for rotating said shaft to different positions for moving the coils into and out of the circuit in steps to provide resistance which is a multiple of a unit resistance.

3. In a rheostat, an insulating body having a plurality of recesses therein, a resistance coil for each recess each coil having its ends spanning a recess, a conducting fluid in said recesses, and means for causing the level of said fluid to rise and fall for shunting any one of the coils from a circuit and returning it to the circuit independent of its position in the series.

4. In a rheostat, an insulating body having a plurality of recesses therein, a resistance coil for each recess, each coil having its terminal ends spanning a recess and disposed in alignment, a conducting fluid in said recesses which normally bridges said terminal ends, and means for causing the level of said fluid to rise and fall in any of said recesses independent of other of said recesses for shunting the coil from a circuit and returning it to the circuit independently and collectively, said moving means being a plunger for each recess movable into the liquid therein to move the liquid into bridging and nonbridging relationship with a coil.

5. In a rheostat, an insulating body having a plurality of recesses therein, a resistance coil for each recess each coil having its ends spanning a recess, a conducting fluid in said recesses, means for causing the level of said fluid to rise and fall for shunting the coil from a circuit and returning it to the circuit, said moving means being a plunger movable into the liquid to move it into bridging and nonbridging relationship with a coil, cam means for each of said plungers, a shaft mounting said cam means, and a dial knob for rotating said shaft and regulating the level of the liquid in said recesses to have the associated coil disposed in or out of the circuit.

6. In a rheostat, an insulating body having a plurality of recesses therein, a resistance coil for each recess each coil having its ends spanning a recess, a conducting fluid in said recesses, and means for causing the level of said fluid to rise and fall for shunting the coil from a circuit and returning it to the circuit, said moving means being a plunger movable into the liquid to move it into bridging and nonbridging relationship with a coil, said recesses being of inverted E-shape with the plunger extending into the central arm thereof to move the mercury therefrom into bridging relationship across the outer two arms in which the ends of the associated coil extend.

7. In a rheostat, an insulating body having a plurality of recesses therein, a resistance coil for each recess each coil having its ends spanning a recess, a conducting fluid in said recesses, and means for causing the level of said fluid to rise and fall for shunting the coil from a circuit and returning it to the circuit, said recesses being of inverted E shape having the central arm communicating with a cylinder containing a piston operated by a plunger for moving the mercury from the central arm across the end arms to thereby shunt the ends of the coil connecting the latter arms.

8. A rheostat comprising a body of insulating material, a plurality of resistance coils supported by said body disposed in series relation to each other, means for shunting one or a plurality of the coils from the series, said shunting means being mercury and said coils being connected across a plurality of recesses, each said recess being of inverted C shape with the ends of the coil connected to the ends of the recess, and a plunger movable across the center of the C-shaped body portion and separating the mercury to interrupt the shunt across the ends of the coil caused by the mercury when filling the recess.

9. In a rheostat, an insulating body having a plurality of recesses therein, a resistance coil for each recess each coil having its ends spanning a recess, a conducting fluid in said recesses, means for causing the level of said fluid to rise and fall for shunting the coil from a circuit and returning it to the circuit, and conducting studs connecting adjacent recesses, the endmost studs being threaded and extended to form terminals whereby all of the coils can be disposed in series relation to each other.

10. In a rheostat, an insulating body having a plurality of recesses therein, a resistance coil for each recess each coil having its ends spanning a recess, a conducting fluid in said recesses, means for causing the level of said fluid to rise and fall for shunting the coil from a circuit and returning it to the circuit, said moving means being a plunger movable into the liquid to move it into bridging and nonbridging relationship with a coil, cam means for each of said plungers, a shaft mounting said cam means, a dial knob for rotating said shaft and regulating the level of the liquid in said recesses to have the associated coil disposed in or out of the circuit, and spring means for urging said plungers upwardly against the cam means.

11. A rheostat comprising a body of insulating material, a plurality of resistance coils supported by said body with the terminal ends in alignment, mercury shunting all of said ends, and means between the terminals of each coil for interrupting the mercury thereacross for encircuiting said coil in series with said mercury or other of said coils.

12. A rheostat comprising a body of insulating material, a plurality of resistance coils supported by said body with the terminal ends disposed in alignment, mercury connecting all of said terminal ends and shunting out all of said coils, and means for interrupting the mercury between the terminal ends of any of said coils thereby to encircuit the coil in series with the mercury and other of said coils.

References Cited in the file of this patent
UNITED STATES PATENTS

| | | |
|---|---|---|
| 1,146,592 | Northrup | July 13, 1915 |
| 1,226,546 | McDowell | May 15, 1917 |

FOREIGN PATENTS

| | | |
|---|---|---|
| 51,672 | Germany | Jan. 15, 1889 |